US009635745B1

(12) United States Patent
Zhou

(10) Patent No.: US 9,635,745 B1
(45) Date of Patent: Apr. 25, 2017

(54) WIRELESS REMOTE CONTROL CIRCUIT

(71) Applicant: Zhi Bin Zhou, Dongguan (CN)

(72) Inventor: Zhi Bin Zhou, Dongguan (CN)

( * ) Notice: Subject to any disclaimer, the term of this patent is extended or adjusted under 35 U.S.C. 154(b) by 0 days.

(21) Appl. No.: 15/157,392

(22) Filed: May 17, 2016

(30) Foreign Application Priority Data

Nov. 24, 2015  (CN) ............... 2015 2 0944690 U

(51) Int. Cl.
*H05B 37/02* (2006.01)
*H05B 33/08* (2006.01)

(52) U.S. Cl.
CPC ..... *H05B 37/0272* (2013.01); *H05B 33/0815* (2013.01); *H05B 33/0857* (2013.01)

(58) Field of Classification Search
CPC ............ H05B 37/0272; H05B 33/0815; H05B 33/0857
USPC ........................................ 315/291
See application file for complete search history.

(56) References Cited

U.S. PATENT DOCUMENTS

| 2004/0090315 | A1* | 5/2004 | Mackjust | B60R 25/104 340/426.13 |
| 2008/0239451 | A1* | 10/2008 | Mitchell | G02F 1/15 359/265 |
| 2010/0327766 | A1* | 12/2010 | Recker | H02J 9/02 315/291 |
| 2011/0074561 | A1* | 3/2011 | Mackjust | B60R 25/10 340/426.13 |
| 2012/0123508 | A1* | 5/2012 | Wentz | A61N 1/3787 607/88 |
| 2016/0095193 | A1* | 3/2016 | Mokhtari | H05B 37/0272 315/307 |
| 2016/0116925 | A1* | 4/2016 | Freeman | H02M 3/33546 307/130 |

* cited by examiner

Primary Examiner — Don Le
(74) Attorney, Agent, or Firm — Wayne & King LLC

(57) ABSTRACT

Disclosed is a wireless remote control circuit, comprising a control module, a drive circuit connected with control module, a signal receiving circuit and an operation circuit. When the signal receiving circuit receives an operation signal, a feedback electrical signal to the control module, and the drive circuit supplies power to the control module, signal receiving circuit and operation circuit. Meanwhile, the control module sends control signals to the operation circuit according to the electrical signal. The operation circuit comprises a buck-boost circuit that controls the motor running and a switching circuit that controls switching of the light switch.

7 Claims, 2 Drawing Sheets

WIRELESS REMOTE CONTROL CIRCUIT

FIELD OF THE INVENTION

This utility model relates to the field of wireless transmission control technology, and in particular, relates to a wireless remote control circuit.

BACKGROUND OF THE INVENTION

Artificial Christmas trees available on the markets are mostly fixed in height, and are not adjustable. Users need to calculate or design a required height according to a specific environment, and then purchase the Christmas trees with an appropriate height, which greatly increases the design costs. In addition, when the height is found not enough to match the environment, the trees must be replaced, which causes delay in environmental layout and brings great inconvenience to designers. In order to increase height of the artificial Christmas trees, people have made the artificial Christmas tree with anadjustable height, for example, the utility model patent (application number: CN2010201220345), where height of this type of artificial Christmas tree can be adjusted driven by a motor, but during the adjustment, buttons that control the forward and reverse rotations of motor cannot be operated remotely, which is inconvenient.

In addition, usually color lanterns are adopted for artificial Christmas trees. The color lanterns are composed of different colors of LED lights. When working, it is controlled by controlling IC, but the change of color lanterns is fixed, which cannot be changed according to needs, so, it cannot meet different demands.

SUMMARY OF THE INVENTION

The utility model provides a wireless remote control circuit for solving the problems of prior art. The wireless remote control circuit can easily adjust the height of Christmas trees and easily adjust the working mode of the color lanterns, and it is easy to operate remotely.

To solve the above technical problems, this utility model adopts the following technical solutions:

A wireless remote control circuit comprises a control module, a drive circuit connected with control module, a signal receiving circuit and an operation circuit. When the signal receiving circuit receives an operation signal from the operation circuit, a feedback electrical signal is sent to the control module, and the drive circuit supplies power to the control module, the signal receiving circuit, and the operation circuit. Meanwhile, the control module sends control signals to the operation circuit according to the electrical signal; the operation circuit comprises a buck-boost circuit that controls the motor running and a switching circuit that controls the switching of the light switch.

Wherein, the control module includes EM78P153 model of SCM.

Further, the drive circuit includes a NPN type transistor Q7 and a NPN type transistor Q8; includes a resistance R24 and one end of resistance R24 is connected to the first pin of SCM and the other end is connected to one end of resistor R23; the other end of resistor R23 is connected to the collector of transistor Q7. The contact of resistor R23 and the collector of transistor Q7 is connected to the twelfth pin of SCM, the emitter of transistor Q7 is grounded, and the base of transistor Q7 is connected with resistor R20 and resistor R19 in series and grounded. The contacts of resistor R20 and resistor R19 are forwardly connected in series with VR tube D5 and diode D2 and connected with resistor R1; the capacitor C10 and capacitor C13 are connected in parallel to form the first parallel circuit, and one end of which is connected to the contact of VR tube D5 and diode D2 and the other end is grounded. VR tube D1 and capacitor C4, capacitor C6 are connected in parallel to form the second parallel circuit, and the reverse end of VR tube D1 of the second parallel circuit is connected to one end of resistor R1, the other end of resistor R1 is reversely connected to the diode D2, and the forward end of VR tube D1 in the second parallel circuit is grounded. The contact of resistor R1 and the second parallel circuit is connected to one end of R18, and the other end of R18 is connected to the fourth pin of SCM which is grounded through the capacitor C14 and capacitor C15. The fifth pin, sixth pin and seventh pin of SCM are connected in series with button switch SW1, button switch SW2 and push-button switch SW3 respectively and grounded. The contact of seventh pin of SCM and the button switch SW3 is connected with resistor R3 in series, to connect the contact of resistor R1 and resistor R18. The contact of VR tube D2 and resistor R1 outputs DC power supply VDD externally. The non-grounded end of the first parallel circuit outputs a DC power supply V1, and the non-grounded end of the second parallel circuit outputs a DC power supply V2. Both ends of the capacitor C13 are connected to the input interface of the drive circuit, respectively.

Further, the control module is connected to a memory circuit. The memory circuit includes an AT24C02 memory, and the first pin, second pin, third pin and fourth pin of the memory are grounded, the first pin is connected to one end of the capacitor C8, and the other end of capacitor C8 is connected to one end of resistor R18. The fifth pin of memory is connected to one end of resistor R13, and the contact of the fifth pin of memory and resistor R13 is connected to the contact of the fifth pin of SCM and the button switch SW1. The other end of R13 is connected to the contact of resistor R18 and the second parallel circuit. The sixth pin of the memory is connected to one end of resistor R12 in series and the contact of the sixth pin of the memory and resistor R12 is connected to the contact of the sixth pin of SCM and button switch SW2. The other end of resistor R12 is connected to the contact of resistor 18 and the second parallel circuit; the seventh pin of memory is grounded; the eighth pin of the memory is connected to the contact of the capacitor C8 and resistor R18.

Further, the buck-boost circuit includes a NPN type transistor Q5 and a NPN type transistor Q6; also includes a resistor R17, one end of resistor 17 is connected to the thirteen pin of SCM and the other end of resistor 17 is connected to the base of transistor Q6; the emitter of transistor Q6 is grounded; the DC power supply V1 is connected to one end of resistor R16 in series and the other end of resistor R16 is reversely connected in series to diode D4, the forward end of diode D4 is connected to the collector of transistor Q6; also includes resistor R14, one end of resistor R14 is connected to the fourteenth pin of SCM and the other end of resistor R14 is connected to the base of transistor Q5; the emitter of transistor Q5 is grounded; the DC power supply V1 is connected to one end of resistor R15 in series and the other end of resistor R15 is reversely connected in series to diode D3, the forward end of diode D3 is connected to the collector of transistor Q5; also includes two SRD relays, respectively SRD relay I and SRD relay II; two terminals of coil of SRD relay I are connected to two ends of diode of diode D4 respectively, and two terminals of coil of SRD relay II are connected to two ends of diode D3 respectively; the common contact of SRD relay I is connected with the common contact of SRD relay II, to connect to the contact of resistor R21 and resistor R22; the NC contact of SRD relay I and NC contact of SRD relay II are connected to the interface of motor that controls the operation of motor respectively; the NO contact of SRD relay I and NO contact of SRD relay II are connected, and then connected to DC power supply V1.

Further, the switching circuit includes NPN type transistor Q1 and transistor Q2, and PNP type transistor Q3 and transistor Q4; also includes a resistor R5 and a resistor R4; one end of resistor R5 is connected to the eighth pin of SCM and the other end of resistor R5 is connected to the base of transistor Q2; the emitter of transistor Q2 is grounded; one end of resistor R4 is connected to the ninth pin of SCM and the other end of resistor R4 is connected to the base of transistor Q1, the emitter of transistor Q1 is grounded; the emitter of transistor Q4 is connected with one end of resistor R8 and then connected to DC power supply VDD, the base of transistor Q4 is connected with one end of resistor R10 and then connected to the other end of resistor R8; the emitter of transistor Q3 is connected in parallel with one end of resistor R7 and then connected to DC power supply VDD; the base of transistor Q3 is connected with one end of resistor R9 and then connected to the other end of resistor R7; the collector of transistor Q1 is connected to collector of transistor Q3 and then connected to another end of resistor R10; the collector of transistor Q2 is connected to collector of transistor Q4 and then connected to another end of resistor R9; the contact of the collector of transistor Q1 and the collector of transistor Q3 and the contact of the collector of transistor Q2 and the collector of transistor Q4 are respectively connected to two contacts of R6 respectively, which are connected to the light interfaces that control the switchover of the light switches respectively.

Further, the signal receiving circuit includes RF83C model of IC; the first pin of IC is grounded; the capacitor C1 is connected in series with capacitor C2 to constitute the first series circuit which is connected in series to inductor L2; one end of inductor L2 is grounded and the other end of inductor L2 is connected to the second pin of IC; the inductor L1 is connected in parallel with capacitor C1, one end of the inductor L1 is grounded and the other end of inductor L1 is connected to an antenna TP1; DC power supply V2 is connected to one end of resistor R11 and the other end of resistor R11 is connected to the third pin of IC; one end of capacitor C5 and capacitor C9 is grounded and the other end of capacitor C5 and capacitor C is connected to another end of resistor R11; the fourth pin of IC is connected in series with capacitor C7 and then grounded; the fifth pin of IC is connected in series with capacitor C11 and then grounded; the tenth pin of SCM is connected to the contact of fifth pin of IC and capacitor 11; the sixth pin of IC is connected in series with one end of resistor R2 and the other end of resistor R2 is grounded; the seventh pin of IC is connected in series with one end of capacitor C3 and the other end of capacitor C3 is grounded; the eighth pin of IC is connected in series with one end of crystal oscillator X1, and the other end of crystal oscillator X1 is grounded.

The utility model can achieve the following beneficial effect: the lifting and descending of Christmas tree is driven by the motor through forward and reverse rotations, and glowing state of color lights is controlled by the switching circuit, which can be controlled remotely, easy to operate.

DETAILED DESCRIPTION OF THE EMBODIMENTS

For the understanding of the technicians skilled in the art, this utility model is further described in combination with drawings and embodiments.

Figure 1:
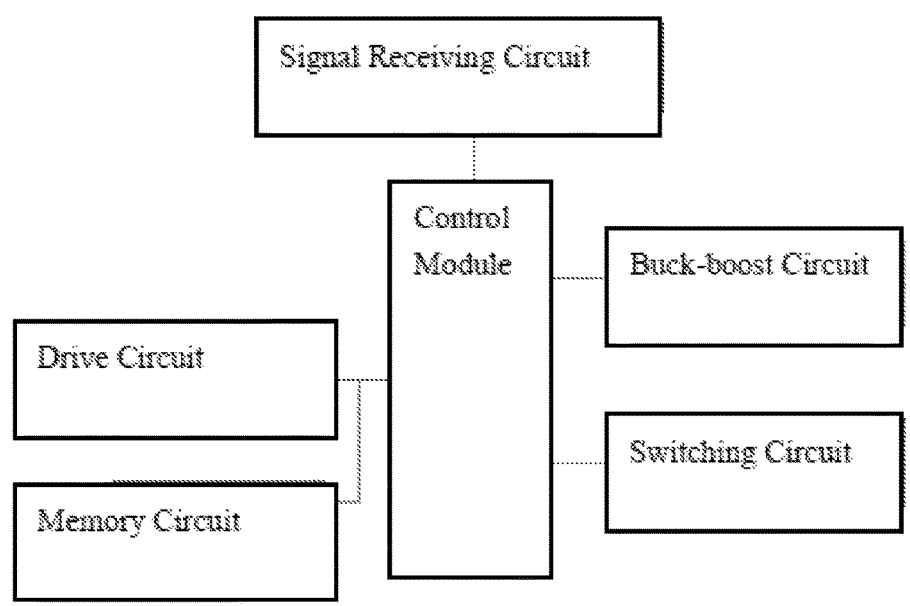
FIG. 1 is a block diagram showing structure of a utility model.
Figure 2:
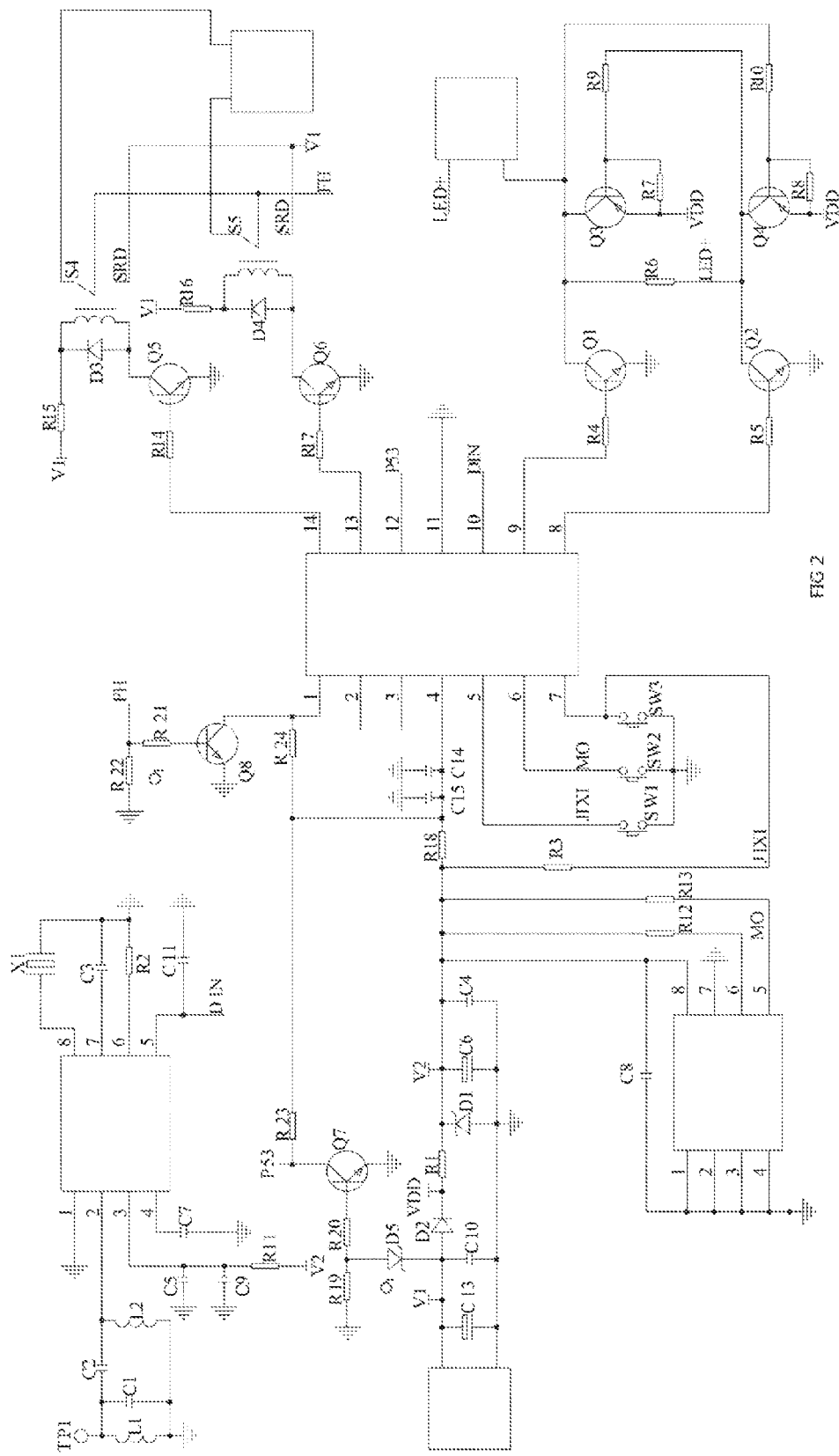
FIG. 2 is a circuit diagram of the utility model.

Referring to FIG. 1 and FIG. 2, a wireless remote control circuit, comprising a control module, a drive circuit connected with a control module, a signal receiving circuit, and an operation circuit. When the signal receiving circuit receives an operation signal from the operation circuit, a feedback electrical signal to the control module, and the drive circuit supplies power to the control module, the signal receiving circuit and the operation circuit. Meanwhile, the control module sends control signals to the operation circuit according to the electrical signal. The operation circuit comprises a buck-boost circuit that controls the motor running and a switching circuit that controls the switching of the light switch.

When controlling the lifting of a Christmas tree, movement of the trunk of the tree can be driven by a motor. A communication mechanism with the external signals is established by designing the signal receiving circuit, to control the running of motor and working state of lights. The signal receiving circuit is wireless reception circuit such as BLUETOOTH, infrared, WIFI, etc. The control modules can be a processor, IC, SCM, and so on. The drive circuit is a power module, providing the voltage supply required by the whole circuit. The buck-boost circuit, switching circuit can be switch circuit, by changing the direction of current flow, the motor running direction can be changed and the working mode of light can be switched.

In this embodiment, the control module includes an EM78P153 SCM. EM78P153 is an 8-bit SCM produced by high-speed CMOS process, with 512*13 one-time ROM (OTPROM) inside. Therefore, users can easily improve the program. The program codes can be written into the chips using EMC programmer 13 optional bits can be available to meet the user requirements, and the protection bits can be used to prevent programs from being read out.

The drive circuit includes a NPN type transistor Q7 and a NPN type transistor Q8; also includes resistor R24 and resistor R23 that connect the first pin of SCM after connected in series, the other end of resistor R23 is connected to the collector of transistor Q7. The contact of resistor R23 and the collector of transistor Q7 is connected to the twelfth pin of SCM, the emitter of transistor Q7 is grounded, and the base of transistor Q7 is connected with resistor R20 and resistor R19 in series and grounded. The contacts of resistor R20 and resistor R19 are forwardly connected in series with VR tube D5 and diode D2 and connected with resistor R1; the capacitor C10 and capacitor C13 are connected in parallel to form the first parallel circuit, and one end of which is connected to the contact of VR tube D5 and diode D2 and the other end is grounded. VR tube D1 and capacitor C4, capacitor C6 are connected in parallel to form the second parallel circuit, and the reverse end of VR tube D1 of the second parallel circuit is connected to one end of resistor R1, the other end of resistor R1 is reversely connected to the diode D2, and the forward end of VR tube D1 in the second parallel circuit is grounded. The contact of resistor R1 and the second parallel circuit is connected to one end of R18, and the other end of R18 is connected to the fourth pin of SCM which is grounded through the capacitor C14 and capacitor C15. The fifth pin, sixth pin and seventh pin of SCM are connected in series with button switch SW1, button switch SW2 and push-button switch SW3 respectively and grounded. The contact of seventh pin of SCM and the button switch SW3 is connected with resistor R3 in series, to connect the contact of resistor R1 and resistor R18. The contact of VR tube D2 and resistor R1 outputs DC power supply VDD externally. The non-grounded end of the first parallel circuit outputs a DC power supply V1, and the non-grounded end of the second parallel circuit outputs a DC power supply V2. Both ends of the capacitor C13 are connected to the input interface of the drive circuit, respectively. The drive circuit is also provided with three button switches, so as to operate the circuit when the remote control cannot be used.

The drive circuit is connected with an external power supply via an input interface. After voltage stabilization through a capacitor C13, it can output a stable power V1, which supplies power to the motor. In addition, after the pressure drop through the diode D2, it can output the power VDD which can supply power for the lights. After voltage division via the resistor R1, it can output a 5V power supply for all kinds of chips.

Further, the control module is connected to a memory circuit. The memory circuit includes an AT24C02 memory, and the first pin, second pin, third pin and fourth pin of the memory are grounded, the first pin is connected to one end of the capacitor C8, and the other end of capacitor C8 is connected to one end of resistor R18. The fifth pin of memory is connected to one end of resistor R13, and the contact of the fifth pin of memory and resistor R13 is connected to the contact of the fifth pin of SCM and the button switch SW1. The other end of R13 is connected to the contact of resistor R18 and the second parallel circuit. The sixth pin of the memory is connected to one end of resistor R12 in series and the contact of the sixth pin of the memory and resistor R12 is connected to the contact of the sixth pin of SCM and button switch SW2. The other end of resistor R12 is connected to the contact of resistor 18 and the second parallel circuit; the seventh pin of memory is grounded; the eighth pin of the memory is connected to the contact of the capacitor C8 and resistor R18. The setting of memory circuit ensures that the re-energizing of the circuit can restore to the working condition of the circuit before power failure. The setting of circuit is reasonable, simple, with convenient and practical functions.

The buck-boost circuit includes a NPN type transistor Q5 and a NPN type transistor Q6; also includes a resistor R17, one end of resistor 17 is connected to the thirteen pin of SCM and the other end of resistor 17 is connected to the base of transistor Q6; the emitter of transistor Q6 is grounded; the DC power supply V1 is connected to one end of resistor R16 in series and the other end of resistor R16 is reversely connected in series to diode D4, the forward end of diode D4 is connected to the collector of transistor Q6; also includes resistor R14, one end of resistor R14 is connected to the fourteenth pin of SCM and the other end of resistor R14 is connected to the base of transistor Q5; the emitter of transistor Q5 is grounded; the DC power supply V1 is connected to one end of resistor R15 in series and the other end of resistor R15 is reversely connected in series to diode D3, the forward end of diode D3 is connected to the collector of transistor Q5; also includes two SRD relays, respectively SRD relay I and SRD relay II; two terminals of coil of SRD relay I are connected to two ends of diode D4 respectively, and two terminals of coil of SRD relay II are connected to two ends of diode D3 respectively; the common contact of SRD relay I is connected with the common contact of SRD relay II, to connect to the contact of resistor R21 and resistor R22; the NC contact of SRD relay I and NC contact of SRD relay II are connected to the interface of motor that controls the operation of motor respectively; the NO contact of SRD relay I and NO contact of SRD relay II are connected, and then connected to DC power supply V1. Through the coordination of two groups of NPN type transistors and SRD relays, the circuit achieves the change to the SCM transmission operation signal, to control the current pulses of lifting motor, to complete the forward rotation and reverse rotation of motor. The circuit design is simple and reasonable.

The switching circuit includes NPN type transistor Q1 and transistor Q2, and PNP type transistor Q3 and transistor Q4; also includes a resistor R5 and a resistor R4; one end of resistor R5 is connected to the eighth pin of SCM and the other end of resistor R5 is connected to the base of transistor Q2; the emitter of transistor Q2 is grounded; one end of resistor R4 is connected to the ninth pin of SCM and the other end of resistor R4 is connected to the base of transistor Q1, the emitter of transistor Q1 is grounded; the emitter of transistor Q4 is connected with one end of resistor R8 and then connected to DC power supply VDD, the base of transistor Q4 is connected with one end of resistor R10 and then connected to the other end of resistor R8; the emitter of transistor Q3 is connected in parallel with one end of resistor R7 and then connected to DC power supply VDD; the base of transistor Q3 is connected with one end of resistor R9 and then connected to the other end of resistor R7; the collector of transistor Q1 is connected to collector of transistor Q3 and then connected to another end of resistor R10; the collector of transistor Q2 is connected to collector of transistor Q4 and then connected to another end of resistor R9; the contact of the collector of transistor Q1 and the collector of transistor Q3 and the contact of the collector of transistor Q2 and the collector of transistor Q4 are respectively connected to two contacts of R6 respectively, which are connected to the light interfaces that control the switchover of the light switches respectively. Through the coordination of two groups of NPN-type transistors and two groups of PNP-type transistors, this circuit has achieved to change the current pulses transmitted to the IC that controls the change of LED lamp color via the operation signals transmitted by SCM, in particular, by controlling the potential at both ends of the resistor R6 and changing the direction of output current, the string lights in different connection ways can be switched to give out light, achieve the subsequent color change of LED lights. The circuit design is simple and reasonable.

The signal receiving circuit includes RF83C model of IC; the first pin of IC is grounded; the capacitor C1 is connected in series with capacitor C2 to constitute the first series circuit which is connected in series to inductor L2; one end of inductor L2 is grounded and the other end of inductor L2 is connected to the second pin of IC; the inductor L1 is connected in parallel with capacitor C1, one end of the inductor L1 is grounded and the other end of inductor L1 is connected to an antenna TP1; DC power supply V2 is connected to one end of resistor R11 and the other end of resistor R11 is connected to the third pin of IC; one end of capacitor C5 and capacitor C9 is grounded and the other end of capacitor C5 and capacitor C is connected to another end of resistor R11; the fourth pin of IC is connected in series with capacitor C7 and then grounded; the fifth pin of IC is connected in series with capacitor C11 and then grounded; the tenth pin of SCM is connected to the contact of fifth pin of IC and capacitor 11; the sixth pin of IC is connected in series with one end of resistor R2 and the other end of resistor R2 is grounded; the seventh pin of IC is connected in series with one end of capacitor C3 and the other end of capacitor C3 is grounded; the eighth pin of IC is connected in series with one end of crystal oscillator X1, and the other end of crystal oscillator X1 is grounded. The circuit adopts the superheterodyne receiver principle. The antenna receives the operation signals and transmits to the receiver chips. After internal adjustment, the chips can achieve the reduction of digital signals and transmission to SCM.

The foregoing utility model has been described in detail by way of illustration and example for purposes of clarity and understanding. As is readily apparent to one skilled in the art, the foregoing are only some of the methods and compositions that illustrate the embodiments of the foregoing invention. It will be apparent to those of ordinary skill in the art that variations, changes, modifications and alterations may be applied to the compositions and/or methods described herein without departing from the true spirit, concept and scope of the utility model.

The invention claimed is:

1. A wireless remote control circuit, comprising a control module, a drive circuit connected with control module, a signal receiving circuit and an operation circuit; when the signal receiving circuit receives an operation signal from the operation circuit, a feedback electrical signal is sent to the control module, and the drive circuit supplies power to the control module, the signal receiving circuit and the operation circuit; the control module sends control signals to the operation circuit according to the feedback electrical signal; the operation circuit comprises a buck-boost circuit that controls a motor running and a switching circuit that controls switching of a light switch.

2. The wireless remote control circuit according to claim 1, wherein the control module comprises EM78P153 model of SCM.

3. The wireless remote control circuit according to claim 2, wherein the drive circuit comprises a NPN type transistor Q7 and a NPN type transistor Q8; comprises a resistance R24 and one end of resistance R24 is connected to the first pin of SCM and the other end is connected to one end of resistor R23; the other end of resistor R23 is connected to the collector of transistor Q7, the contact of resistor R23 and the collector of transistor Q7 is connected to the twelfth pin of SCM, the emitter of transistor Q7 is grounded, and the base of transistor Q7 is connected with resistor R20 and resistor R19 in series and grounded; the contacts of resistor R20 and resistor R19 are forwardly connected in series with VR tube D5 and diode D2 and connected with resistor R1; the capacitor C10 and capacitor C13 are connected in parallel to form the first parallel circuit, and one end of which is connected to the contact of VR tube D5 and diode D2 and the other end is grounded; VR tube D1 and capacitor C4, capacitor C6 are connected in parallel to form the second parallel circuit, and the reverse end of VR tube D1 of the second parallel circuit is connected to one end of resistor R1, the other end of resistor R1 is reversely connected to the diode D2, and the forward end of VR tube D1 in the second parallel circuit is grounded; the contact of resistor R1 and the second parallel circuit is connected to one end of R18, and the other end of R18 is connected to the fourth pin of SCM which is grounded through the capacitor C14 and capacitor C15; the fifth pin, sixth pin and seventh pin of SCM are connected in series with button switch SW1, button switch SW2 and push-button switch SW3 respectively and grounded; the contact of seventh pin of SCM and the button switch SW3 is connected with resistor R3 in series, to connect the contact of resistor R1 and resistor R18; the contact of VR tube D2 and resistor R1 outputs DC power supply VDD externally; the non-grounded end of the first parallel circuit outputs a DC power supply V1, and the non-grounded end of the second parallel circuit outputs a DC power supply V2; both ends of the capacitor C13 are connected to the input interface of the drive circuit, respectively.

4. The wireless remote control circuit according to claim 3, wherein the control module is connected to a memory circuit, the memory circuit comprises an AT24C02 memory, and the first pin, second pin, third pin and fourth pin of the memory are grounded, the first pin is connected to one end of the capacitor C8, and the other end of capacitor C8 is connected to one end of resistor R18; the fifth pin of memory is connected to one end of resistor R13, and the contact of the fifth pin of memory and resistor R13 is connected to the contact of the fifth pin of SCM and the button switch SW1, the other end of R13 is connected to the contact of resistor R18 and the second parallel circuit; the sixth pin of the memory is connected to one end of resistor R12 in series and the contact of the sixth pin of the memory and resistor R12 is connected to the contact of the sixth pin of SCM and button switch SW2, the other end of resistor R12 is connected to the contact of resistor 18 and the second parallel circuit; the seventh pin of memory is grounded; the eighth pin of the memory is connected to the contact of the capacitor C8 and resistor R18.

5. The wireless remote control circuit according to claim 3, wherein the buck-boost circuit comprises a NPN type transistor Q5 and a NPN type transistor Q6; also comprises a resistor R17, one end of resistor 17 is connected to the thirteen pin of SCM and the other end of resistor 17 is connected to the base of transistor Q6; the emitter of transistor Q6 is grounded; the DC power supply V1 is connected to one end of resistor R16 in series and the other end of resistor R16 is reversely connected in series to diode D4, the forward end of diode D4 is connected to the collector of transistor Q6; also comprises resistor R14, one end of resistor R14 is connected to the fourteenth pin of SCM and the other end of resistor R14 is connected to the base of transistor Q5; the emitter of transistor Q5 is grounded; the DC power supply V1 is connected to one end of resistor R15 in series and the other end of resistor R15 is reversely connected in series to diode D3, the forward end of diode D3 is connected to the collector of transistor Q5; also comprises two SRD relays, respectively SRD relay I and SRD relay II; two terminals of coil of SRD relay I are connected to two ends of diode D4 respectively, and two terminals of coil of SRD relay II are connected to two ends of diode D3 respectively; the common contact of SRD relay I is connected with the common contact of SRD relay II, to connect to the contact of resistor R21 and resistor R22; the NC contact of SRD relay I and NC contact of SRD relay II are connected to the interface of motor that controls the operation of motor respectively; the NO contact of SRD relay I and NO contact of SRD relay II are connected, and then connected to DC power supply V1.

6. The wireless remote control circuit according to claim 3, wherein the switching circuit comprises NPN type transistor Q1 and transistor Q2, and PNP type transistor Q3 and transistor Q4; also comprises a resistor R5 and a resistor R4; one end of resistor R5 is connected to the eighth pin of SCM and the other end of resistor R5 is connected to the base of transistor Q2; the emitter of transistor Q2 is grounded; one end of resistor R4 is connected to the ninth pin of SCM and the other end of resistor R4 is connected to the base of transistor Q1, the emitter of transistor Q1 is grounded; the emitter of transistor Q4 is connected with one end of resistor R8 and then connected to DC power supply VDD, the base of transistor Q4 is connected with one end of resistor R10 and then connected to the other end of resistor R8; the emitter of transistor Q3 is connected in parallel with one end of resistor R7 and then connected to DC power supply VDD; the base of transistor Q3 is connected with one end of resistor R9 and then connected to the other end of resistor R7; the collector of transistor Q1 is connected to collector of transistor Q3 and then connected to another end of resistor R10; the collector of transistor Q2 is connected to collector of transistor Q4 and then connected to another end of resistor R9; the contact of the collector of transistor Q1 and the collector of transistor Q3 and the contact of the collector of transistor Q2 and the collector of transistor Q4 are respectively connected to two contacts of R6 respectively, which are connected to the light interfaces that control the switchover of the light switches respectively.

7. The wireless remote control circuit according to claim 2, wherein the signal receiving circuit comprises RF83C model of IC; the first pin of IC is grounded; the capacitor C1 is connected in series with capacitor C2 to constitute the first series circuit which is connected in series to inductor L2; one end of inductor L2 is grounded and the other end of inductor L2 is connected to the second pin of IC; the inductor L1 is connected in parallel with capacitor C1, one end of the inductor L1 is grounded and the other end of inductor L1 is connected to an antenna TP1; DC power supply V2 is connected to one end of resistor R11 and the other end of resistor R11 is connected to the third pin of IC; one end of capacitor C5 and capacitor C9 is grounded and the other end of capacitor C5 and capacitor C is connected to another end of resistor R11; the fourth pin of IC is connected in series with capacitor C7 and then grounded; the fifth pin of IC is connected in series with capacitor C11 and then grounded; the tenth pin of SCM is connected to the contact of fifth pin of IC and capacitor 11; the sixth pin of IC is connected in series with one end of resistor R2 and the other end of resistor R2 is grounded; the seventh pin of IC is connected in series with one end of capacitor C3 and the other end of capacitor C3 is grounded; the eighth pin of IC is connected in series with one end of crystal oscillator X1, and the other end of crystal oscillator X1 is grounded.

\* \* \* \* \*